Jan. 10, 1956   P. E. EDELMAN   2,730,668
REGULATED POWER SUPPLY
Filed Oct. 15, 1954
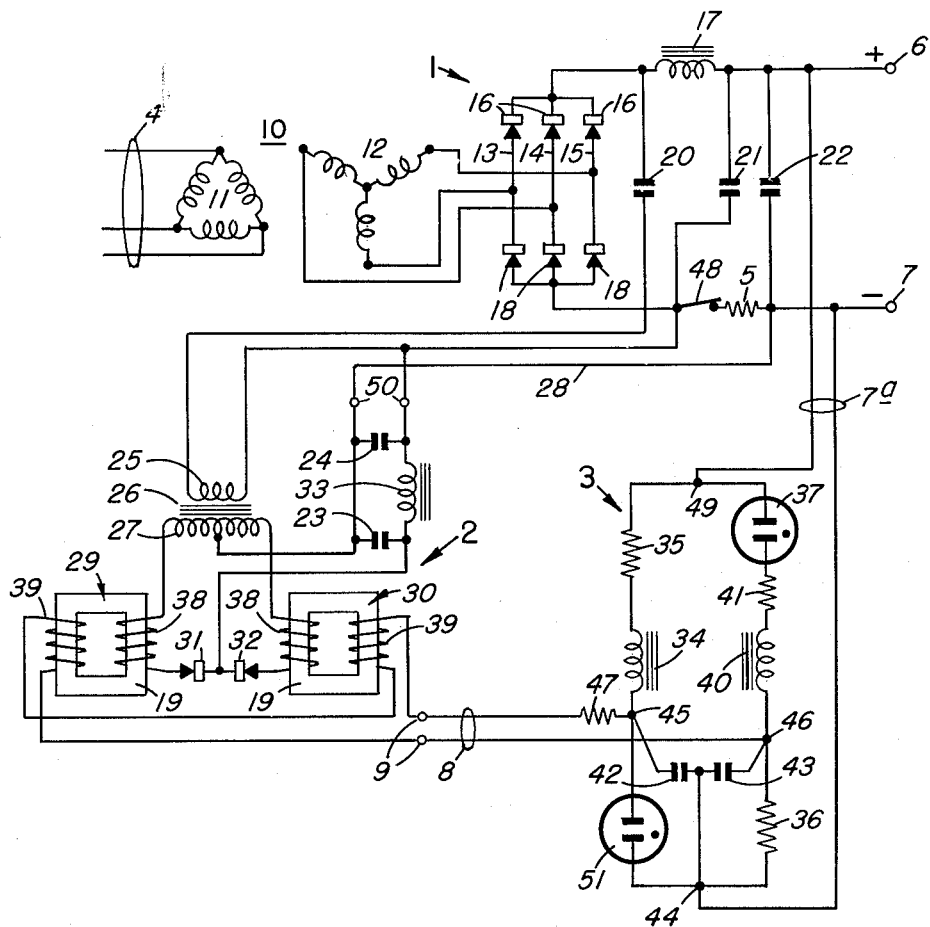
INVENTOR.
P. E. Edelman
BY
*[signature]*
ATTORNEY United States Patent Office 2,730,668
Patented Jan. 10, 1956

2,730,668

REGULATED POWER SUPPLY

Philip E. Edelman, North Hollywood, Calif., assignor to Bendix Aviation Corporation, North Hollywood, Calif., a corporation of Delaware Application October 15, 1954, Serial No. 462,568

10 Claims. (Cl. 321—18)

This invention relates to the conversion of alternating current to direct current and more particularly to systems for this purpose that maintain a very constant direct current output potential despite variations in the load and/or variations in the alternating current input voltage.

An object of the invention is to provide a regulated power supply that responds rapidly to correct departures from the desired output potential.

Another object is to provide a regulated power supply that is relatively simple, rugged and reliable.

Other more specific objects and features of the invention will appear from the description to follow.

In general, regulated power supplies incorporate, in addition to the usual rectifiers and filters, a device capable of varying the output potential of the supply in response to a control potential, and a voltage-sensing circuit that senses the D. C. output potential and responds to slight changes therein to apply to the voltage-varying device a relatively large control potential.

It is well known to employ a conventional magnetic amplifier in the A. C. circuit of the rectifier as a voltage-varying means or to employ electronic amplifiers in the D. C. circuit for the same purpose. Although magnetic amplifiers have recognized advantages over electronic amplifiers, such as simplicity, ruggedness and long life, they have the serious disadvantage of being incapable of responding in a time less than one-half cycle of the alternating current applied thereto. This has prevented their use in many applications where they were otherwise more desirable than electronic amplifiers.

In accordance with the present invention, I employ a magnetic amplifier as a voltage-varying device and reduce the time of response by energizing the associated rectifier with an alternating current of higher frequency than is usually employed. Further, in a preferred embodiment of the invention, I avoid the necessity of providing a special high-frequency A. C. source by employing a main full wave rectifier and filter unit energized from an A. C. source of conventional relatively low frequency and an auxiliary rectifier and filter unit energized from the ripple current supplied by the main rectifier. I then connect the D. C. outputs of the two units, in series, to the load that is to be supplied, and vary the output of the auxiliary unit with a small magnetic amplifier to maintain the combined D. C. output voltage constant. The ripple frequency of the output of a single phase full wave rectifier is twice that of the A. C. source frequency. The ripple frequency of a three-phase full wave rectifier is six times the source frequency. Hence, in a three-phase unit the rate of response of the magnetic amplifier in the auxiliary unit can be increased sixfold over the rate of response obtainable by regulation of the main unit. An additional advantage of using the main and auxiliary units is that, since the auxiliary unit handles only a small fraction of the total power, the magnetic amplifier can be relatively small and inexpensive. The extent of regulation that can be obtained is limited to the maximum voltage output of the auxiliary unit, but there is a large field of use for power supplies capable of accurately compensating for small rapid voltage fluctuations and not subject to large fluctuations.

A full understanding of the invention may be had from the detailed description to follow with reference to the drawing, in which the single figure is a schematic circuit diagram of a power supply in accordance with the invention.

Referring to the drawing, the system therein disclosed comprises a main rectifier and filter unit 1, an auxiliary rectifier and filter unit 2, and a voltage error sensing circuit 3.

The main rectifier and filter unit 1 is a conventional three-phase full wave circuit energized from a three-phase power line 4 and delivering direct current through a series resistor 5 to main output terminals 6 and 7. The auxiliary rectifier and filter unit 2 is a full wave rectifier preferably energized from the ripple frequency of the main rectifier and filter unit 1, and having its direct current output terminals 50 connected across (in shunt to) the resistor 5, so that its voltage adds to or subtracts from the voltage delivered by the main unit. The error-sensing means 3 has input leads 7a connected across the main output terminals 6 and 7 and has output leads 8 which are connected to the control terminals 9 of a magnetic amplifier in the auxiliary unit 2. When the voltage at the main output terminals 6 and 7 is at a desired value, the error-sensing circuit 3 produces substantially no voltage across the control terminals 9, but if the voltage across the output terminals 6 and 7 departs from the desired value, a D. C. control voltage is applied to the control terminals 9, which acts through the magnetic amplifier in the auxiliary unit, to vary the D. C. output potential applied therefrom across the resistor 5, in a direction to restore the potential across the output terminals 6 and 7 to its normal value.

The main rectifier and filter unit includes a transformer 10 having a delta-connected primary winding 11 and a Y-connected secondary winding 12, the three output terminals of which are connected to three leads 13, 14 and 15, respectively. Each of these leads is connected through a separate rectifier 16 to deliver current of positive polarity through a filter choke 17 to the positive output terminal 6. Each of the leads 13, 14 and 15 is also connected through a separate rectifier 18 to deliver current of negative polarity through the resistor 5 to the negative output terminal 7. The current delivered through the rectifiers 16 and 18 is filtered by the choke reactor 17 in conjunction with three shunt condensers 20, 21 and 22. The condensers 21 and 22 are connected directly from the positive output terminal 6 to the opposite ends of the resistor 5 and function as smoothing condensers. One side of the condenser 20 is connected between the rectifiers 16 and the choke 17. In a conventional circuit, the other side of condenser 20 would be connected to the negative lead at the left end of the resistor 5. This condenser 20 acts to bypass the major portion of the ripple component of the rectifier. In the present instance, the ripple voltage is employed to energize the auxiliary unit 2, and to this end the condenser is connected between the input end of choke 17 through the primary winding 25 of a transformer 26 in the auxiliary unit to the left end of resistor 5, so that a major portion of the ripple component of the output of the main rectifier flows through the primary winding 25 of transformer 26. As previously indicated, the ripple frequency applied to the winding 25 is six times the frequency of the A. C. supply circuit 4 which feeds the main rectifier and filter unit 1.

The transformer 26 has a secondary winding 27, a mid-tap on which is connected by a lead 28 directly to the negative main output terminal 7, which terminal is commonly at or near ground potential. The opposite ends of the secondary winding 27 are connected through separate magnetic amplifiers 29 and 30, respectively, and separate rectifiers 31 and 32, respectively, through a filter choke 33 to the left end of the resistor 5, so that the D. C. output of the auxiliary unit is applied in shunt to the resistor 5 and in series with the main rectifier and unit output.

Conventional filter condensers 23 and 24 may be employed in conjunction with the choke 33 to filter the output of the auxiliary unit.

Each magnetic amplifier 29 and 30 comprises a closed core 19, of suitable magnetic material, having a load winding 38 connecting its associated end of the transformer winding 27 with its associated rectifier, and a control winding 39, both of which are connected to the previously mentioned control terminals 9. The windings 39 are preferably connected in series, as shown.

The magnetic amplifiers 29 and 30 operate on the well-known principle that if the closed core 19 is saturated by a direct current in the control winding 39, the load winding 38 will have a minimum impedance and permit a large current to flow to its associated rectifier. On the other hand, when the current in the control windings 39 is reduced, the effective impedances of the load windings 38 are correspondingly increased.

The voltage-sensing means 3 may be of any suitable type. As shown, it comprises a bridge circuit having opposite resistive arms 35 and 36 and opposite arms containing negative resistance devices 37 and 51, here shown as gaseous conduction tubes.

A choke-reactor 34 is connected in series with the resistor 35 and the gas tube 51 to reduce feedback of alternating current induced in the control windings 39 of the magnetic amplifiers to the output terminals 6 and 7. A resistor 41 is preferably also connected in series with the gas tube 37 and in series with a choke-reactor 40 to aid in this filtering effect. The filtering effect is further supplemented by condensers 42 and 43 connected between the bridge terminal 44 and the output terminals 45 and 46 of the bridge. This filtering action may be further increased by the introduction of a resistor 47 in one of the control leads 8.

When the voltage across the output terminals 6 and 7 has a desired value, the potential is the same at terminal 45 as at terminal 46, and the potential across the control terminals 9 of the auxiliary unit is substantially zero. Under these conditions, the windings 38 of the magnetic amplifiers 29 and 30 will have their maximum impedance, and the potential delivered by the auxiliary unit across the resistor 5 will be at a minimum.

Now let it be assumed that the output potential across the terminals 6 and 7 drops slightly. This reduces the current flowing through the bridge circuit of the sensing means 3, causing the resistance of the gas tubes 37 and 38 to rise, whereas the resistance in the other arms of the bridge, including the resistors 35 and 36, respectively, remain unchanged. Hence, a resultant voltage is produced between the terminals 45 and 46 and applied to the control terminals 9 to produce a direct current in the control windings 39 of the magnetic amplifiers, in aiding relation to the pulsating current in the load windings 38. This reduces the impedance of the load windings 38, permitting a larger current to flow and developing a larger potential across the resistor 5. The design of the auxiliary unit 2 can readily be such, in conjunction with the design of the voltage-sensing means 3, as to produce a voltage drop across the resistor 5 that very closely corresponds to the voltage drop between the terminals 6 and 7 and hence restores the output voltage of the unit to nearly its normal value.

As shown in the drawing and heretofore described, the D. C. output voltage of the auxiliary unit 2 is in series aiding relation with the D. C. output voltage of the main unit 1. Under these conditions, the resistor 5 can be removed from the circuit by opening the switch 48. The entire load current then flows through the windings 38 of the magnetic amplifiers 29, and they must be designed to handle the larger current.

The voltage of the auxiliary unit 2 can be combined with the voltage of the main unit in series opposition by reversing the connections of the output line of the auxiliary unit to the main units. The resistor 5 is then necessary to complete the output circuit for the main unit, because the current from the main unit cannot pass the auxiliary unit rectifiers 31 and 32. Under these conditions, the total current in the resistor 5 is the sum of the currents of the main and auxiliary units. Hence, increasing the output of the auxiliary unit increases the voltage drop across the resistor 5 and reduces the total output voltage across terminals 6. Obviously, with the latter mode of operation the connections between the line 8 and the control windings 39 of the magnetic amplifier must be so poled that a rise in voltage between the output terminals 6 reduces the impedance of the load windings 38 of the magnetic amplifiers to increase the output current of the auxiliary unit.

Although for the purpose of explaining the invention a particular embodiment thereof has been shown and described, obvious modifications will occur to a person skilled in the art, and I do not desire to be limited to the exact details shown and described.

I claim:

1. A converter for rectifying alternating current, filtering the rectified current and delivering it to a pair of output terminals at a predetermined potential, comprising: a main rectifier and filter unit for receiving alternating current and converting it into a direct current output at a potential differing from said predetermined potential by a fraction of the latter; an auxiliary variable potential rectifier and filter unit for receiving alternating current and converting it to a direct current output of potential substantially equal to said fraction, said auxiliary unit including a pair of control terminals and means responsive to a varying control current applied thereto for varying the potential of the direct current output relative to the alternating current input of said auxiliary unit; means connecting the direct current outputs of said main and auxiliary units in series relation between said output terminals; and a voltage-sensing means for deriving from the direct current voltage across said output terminals and applying to said control terminals of said auxiliary unit a D. C. control current variable with the potential across said output terminals, and in direction such that changes in the output voltage of the auxiliary unit oppose departures of the potential between said output terminals from said predetermined value.

2. Apparatus according to claim 1 including means for supplying alternating current to said auxiliary unit of higher frequency than that supplied to said main unit.

3. Apparatus according to claim 2 in which said means for varying the direct current output of the auxiliary unit comprises a magnetic amplifier having a closed magnetic core, a load winding in the alternating current circuit of said unit, and a control winding connected to said control terminals.

4. Apparatus according to claim 3 in which said means for deriving said direct current control current includes filtering means interposed between said control terminals and said output terminals for blocking transfer of alternating current from said magnetic amplifier to said output terminals.

5. Apparatus according to claim 3 in which said main rectifier and filter unit comprises a full wave rectifier and filter means for separating the alternating ripple component from the direct component of the rectifier output; and means for applying said alternating ripple component to said auxiliary rectifier to energize it.

6. Apparatus according to claim 5 in which said main rectifier is a polyphase rectifier.

7. Apparatus according to claim 1 including a resistor connected in shunt to the direct current output of said auxiliary rectifier and filter unit.

8. Apparatus according to claim 7 in which said main and auxiliary units are connected in series opposing relation.

9. Apparatus according to claim 2 in which said main rectifier and filter unit comprises a full wave rectifier and filter means for separating the alternating ripple component from the direct component of the rectifier output; and means for applying said alternating ripple component to said auxiliary rectifier to energize it.

10. Apparatus according to claim 2 in which said main rectifier and filter unit comprises a polyphase rectifier and filter means for separating the alternating ripple component from the direct component of the rectifier output; and means for applying said alternating ripple component to said auxiliary rectifier to energize it.

References Cited in the file of this patent

UNITED STATES PATENTS

| | | |
|---|---|---|
| 1,967,303 | Grant | July 24, 1934 |
| 2,431,994 | Dibrell et al. | Dec. 2, 1947 |
| 2,546,181 | Coffin et al. | Mar. 27, 1951 |

FOREIGN PATENTS

| | | |
|---|---|---|
| 92,734 | Sweden | July 5, 1948 |